US008037319B1

(12) United States Patent
Clifford

(10) Patent No.: US 8,037,319 B1
(45) Date of Patent: Oct. 11, 2011

(54) SYSTEM AND METHOD FOR SECURELY STORING CRYPTOGRAPHIC KEYS WITH ENCRYPTED DATA

(75) Inventor: Thomas G. Clifford, Edina, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1096 days.

(21) Appl. No.: 11/478,812

(22) Filed: Jun. 30, 2006

(51) Int. Cl.
*G06F 21/00* (2006.01)
*H04L 9/08* (2006.01)

(52) U.S. Cl. ........................................ 713/193; 380/277

(58) Field of Classification Search ................... 713/193
See application file for complete search history.

(56) References Cited

U.S. PATENT DOCUMENTS

| | | | | |
|---|---|---|---|---|
| 5,719,937 | A * | 2/1998 | Warren et al. | 380/203 |
| 5,991,414 | A * | 11/1999 | Garay et al. | 713/165 |
| 7,242,772 | B1 * | 7/2007 | Tehranchi | 380/223 |
| 2005/0138374 | A1 * | 6/2005 | Zheng et al. | 713/166 |

OTHER PUBLICATIONS

Scott Gordon, "Secondary storage exposures—Storage Networking," Computer Technology Review, available via the Internet at http://www.findarticles.com/p/articles/mi_m0BRZ/is_4_23/ai_102273899/print, Apr. 2003, pp. 1-3.

NeoScale Systems, Inc., "Privacy Compliance Tape Media Protection and Data Privacy Issues," May 2004, pp. 1-6.

Aldar C-F. Chan, "Distributed Symmetric Key Management for Mobile Ad hoc Networks," IEEE Infocom, Mar. 2004, pp. 1-11.

Security Solutions, "IBM Distributed Key Management System (DKMS)," IBM, available via the Internet at http://www-3.ibm.com/security/products/prod_dkms.shtml, Viewed Dec. 16, 2005, pp. 1-5.

* cited by examiner

*Primary Examiner* — Gilberto Barron, Jr.
*Assistant Examiner* — Cordelia Zecher
(74) *Attorney, Agent, or Firm* — Campbell Stephenson LLP

(57) ABSTRACT

The payload of a set of storage devices is encrypted using a payload key that is stored within the set of storage devices itself. However, the payload key is obtainable only if a user has access to n of the storage devices. A first set of keys can be distributed among a set of n storage devices, such that each key is usable to encrypt and/or decrypt a key stored on a different one of the n storage devices. The first set of keys is usable to encrypt portions of the information needed to regenerate another key (e.g., the payload key or a key used to encrypt the payload key). A different portion of the information needed to regenerate the other key is stored on each of the n storage devices. Accordingly, the other key cannot be obtained unless the user has access to all n storage devices.

23 Claims, 7 Drawing Sheets

SYSTEM AND METHOD FOR SECURELY STORING CRYPTOGRAPHIC KEYS WITH ENCRYPTED DATA

FIELD OF THE INVENTION

This invention relates to storage systems and, more particularly, to the persistent storage of encrypted information.

DESCRIPTION OF THE RELATED ART

Many commercial and governmental organizations maintain vast amounts of information. For example, a hospital may maintain records for each patient that has visited the hospital within the past ten years. Similarly, a governmental organization may maintain information regarding different parties' compliance with various laws and regulations. Such information is often confidential. As a result, the organization needs to protect the information from being accessed by unauthorized users.

In certain situations, an organization may need to transfer storage devices containing confidential information from one location to another or otherwise relinquish some amount of control over the storage devices that store the confidential information. In such a situation, an organization will often choose to encrypt the information in order to prevent unauthorized users from being able to access the information on the storage devices. Encryption involves using a value, which is called a cryptographic key (also referred to herein as a key), and a predefined encryption algorithm to scramble the information in such a way that the information cannot be regenerated without the key. Accordingly, even if an unauthorized user gains access to one of the physical storage devices (e.g., by intercepting a shipment of backups that is being sent to a remote site), the unauthorized user will not be able to access the actual information stored on the storage device unless the unauthorized user has also been able to obtain the appropriate key.

One problem that arises when encryption is used on persistent data (also referred to as "data at rest") is that the key used to encrypt a particular set of information needs to be maintained throughout the useful lifetime of the encrypted information. If the key is lost, the encrypted information will effectively be lost as well, since it can no longer be decrypted. Accordingly, there needs to be system for preserving both the encrypted information and the key used to encrypt that information. Many storage vendors provide specialized appliances that keep track of all of the cryptographic keys currently in use within the organization. While these appliances are useful, their presence also introduces additional complication into the organization's storage system. Less complicated techniques for maintaining keys for persistent encrypted information are desired.

SUMMARY

Various embodiments of methods and systems for securely storing cryptographic keys on the same set of storage devices that store information encrypted using the cryptographic keys are disclosed. In one embodiment, a method involves reading a first key from a first storage device, and then using the first key to decrypt a set of information stored on a second storage device. The second set of information includes at least part of a second key. A total of n storage devices must be accessed in order to obtain a key required to decrypt information stored on the first storage device.

The method can also involve reading a first portion of a third key from the first storage device and reading a second portion of the third key from the second storage device. The third key can be, for example, a payload key usable to decrypt user data stored on at least one of the storage devices or another key that is usable to decrypt the payload key.

One embodiment of a method for storing both a key and the information encrypted by the keys stored on that storage device can involve encrypting data for storage using a first key, writing the encrypted data to several storage devices (the information can be subdivided among the storage devices or replicated to each of the storage devices), encrypting the first key using a second key, and writing a respective portion of the first key on each of the storage devices.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
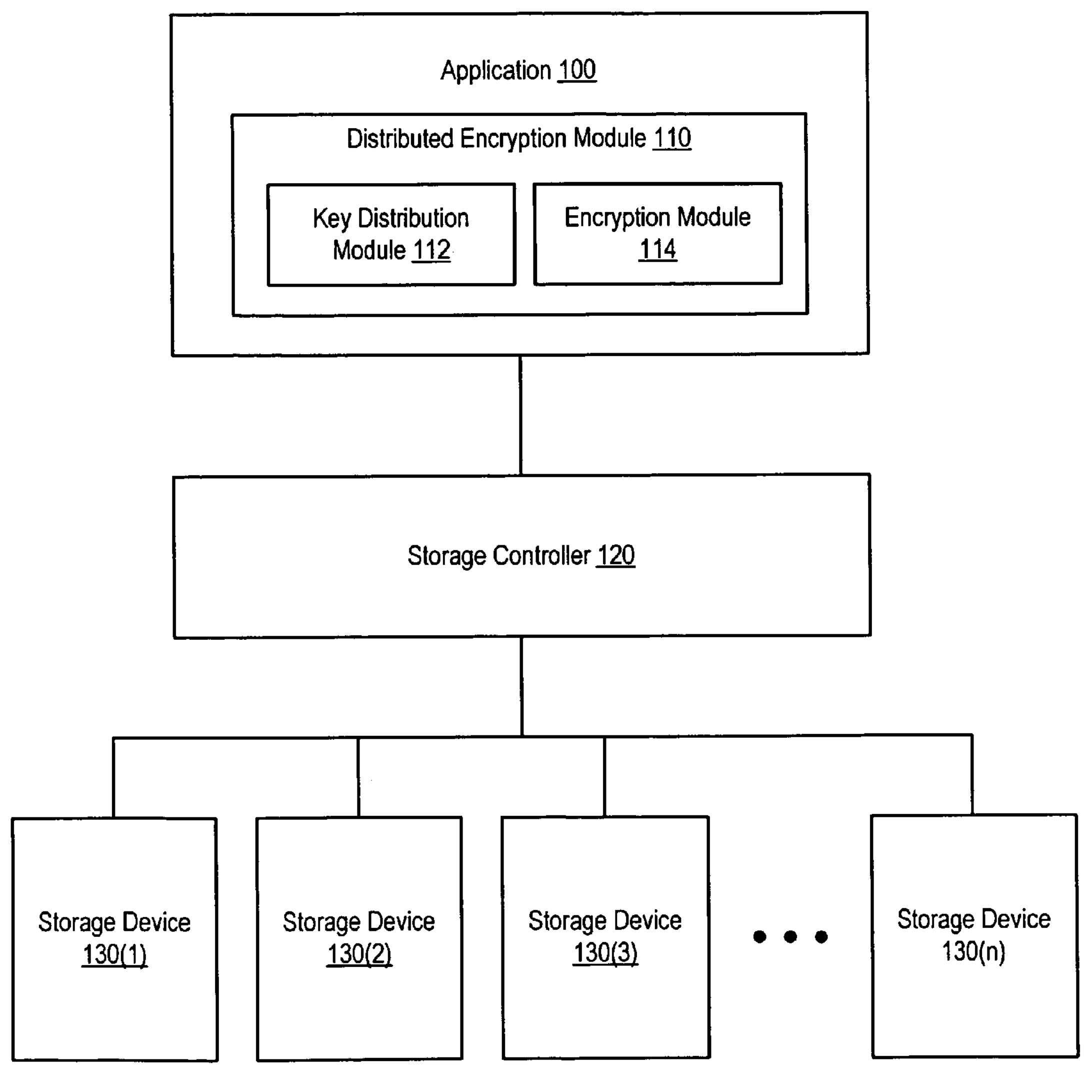
FIG. 1 is a block diagram of a system that is configured to store the keys for encrypting and decrypting a particular set of information on the storage devices that store that information, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The payload of a set of storage devices is encrypted and decrypted using a payload key that is stored within the set of storage devices itself. However, the payload key is obtainable only if a user has access to n of the storage devices. A first set of keys is distributed among a set of n storage devices, such that each key is usable to encrypt and/or decrypt a key stored on a different one of the n storage devices. The first set of keys is usable to encrypt and decrypt portions of the information needed to regenerate another key (such as the payload key or a key used to encrypt the payload key). Only one portion of the information needed to regenerate the other key is stored on each storage device, and a different portion is stored on each of the n storage devices. Accordingly, the other key (which is the payload key or a key usable in the process of decrypting the payload key) cannot be obtained unless the user has access to all n storage devices.

FIG. 1 is a block diagram of a system that is configured to store the keys for encrypting and decrypting a particular set of information on the storage devices that store that information. As shown, the system includes an application 100, which includes a distributed encryption module 110. Distributed encryption module 110 includes a key distribution module 112 and an encryption module 114. Application 100 is coupled to a storage controller 120, which is in turn coupled to a set of n storage devices 130(1)-130(*n*). Storage controller 120 controls access to storage devices 130 and can be, for example, array controller or a network switch.

Collectively, storage devices 130(1)-130(*n*) are referred to as storage devices 130. Storage devices 130 can include one or more types of storage media, including optical media (e.g., compact discs and digital versatile discs) and magnetic media (e.g., hard disks or magnetic tape). For example, storage devices 130 can be tapes, hard drives, compact discs (CDs) or digital video discs (DVDs), and the like. The set of storage devices 130 can be implemented as an array of individual storage devices (e.g., an optical storage jukebox, a "Just a Bunch of Disks" (JBOD) array, or a Redundant Array of Independent Disks (RAID) system).

Figure 6:
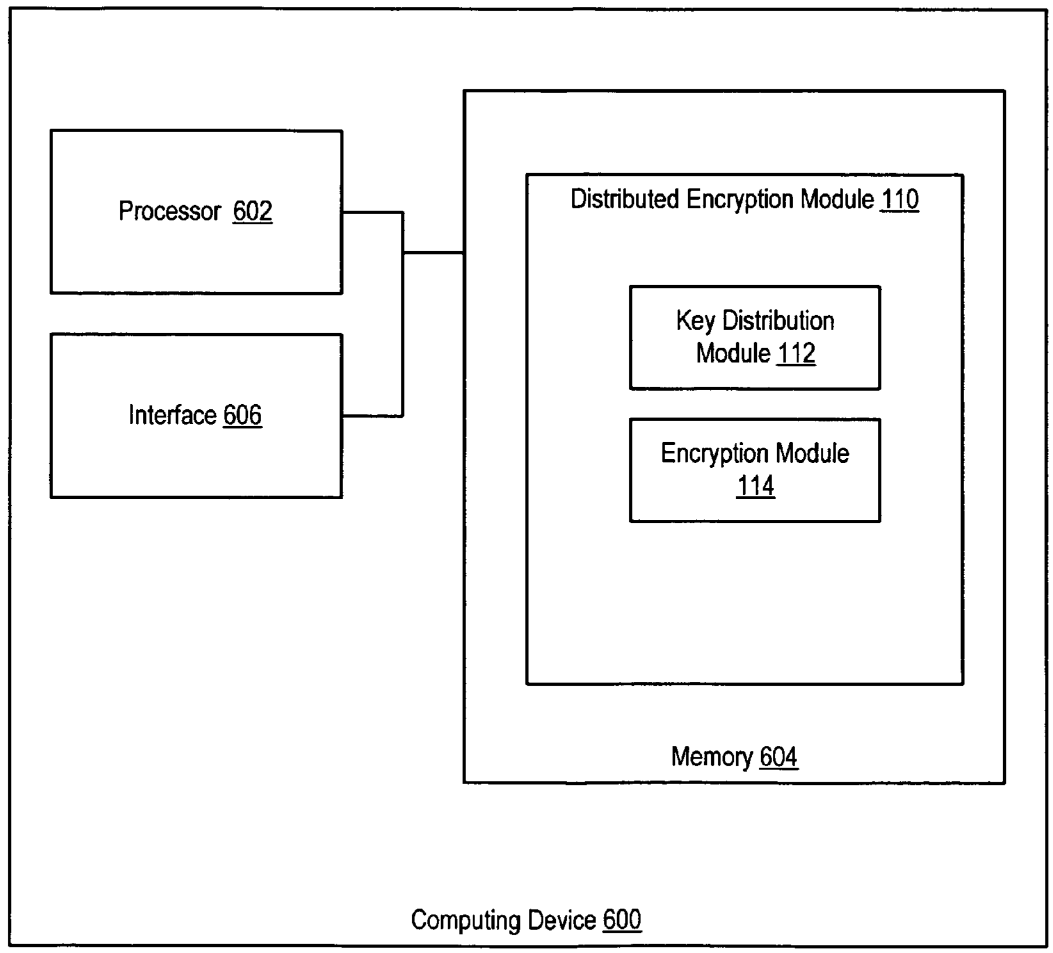
FIG. 6 is block diagram of a computer system configured to encrypt and decrypt a key that is stored on the same set of storage devices that store information encrypted by that key, according to one embodiment of the present invention.

Application 100 is an application that accesses (e.g., reads, writes, creates, and/or deletes) information stored on storage devices 130. Application 100 can be a user application (e.g., word processing program, email program, graphics program, a database application, or the like) or an application that provide services to such user applications (e.g., a file system, volume manager, or backup application). Application 100 can be coupled to storage controller 120 by a network (not shown), including a WAN (Wide Area Network), such as the Internet, one or more LANs (Local Area Networks), and/or one or more SANs (Storage Area Networks). Application 100 can be implemented on a computing device (e.g., a personal computer, server, personal digital assistant, telephone, or the like), as shown in FIG. 6.

Distributed encryption module 110 is an application and/or hardware that is configured to encrypt information being written to storage devices 130 and to store both the key used to encrypt the information and the encrypted information on storage devices 130. The key used to encrypt the information is stored in a specialized manner, which is described in more detail below, such that a user cannot retrieve the key unless the user has access to all n of storage devices 130. Distributed encryption module 110 is also configured to decrypt information written to storage devices 130.

Encryption module 114 is configured to encrypt information according to a predefined encryption algorithm, based on a key provided to encryption module 114 along with the information. The key can be a symmetric key or an asymmetric key (if asymmetric, the key can include and/or be part of a pair of keys). In some embodiments, encryption module implements Advanced Encryption Standard (AES) 128 or AES-256, which respectively use 16 and 32 byte keys.

Key distribution module 112 is configured to provide appropriate keys to encryption module 114 and to control how those keys are encrypted and stored on storage devices 130. For example, when user information (e.g., information written to storage devices 130 by application 100) is to be encrypted, key distribution module 112 can provide a payload key (a key selected to encrypt the user information or payload) to encryption module 114, causing encryption module 114 to encrypt the user information based upon the payload key.

In particular, key distribution module 112 is configured to cause the payload key used to encrypt the payload to itself be encrypted, using another key. Different portions of the encrypted payload key are then stored on each of the n storage devices. The key used to encrypt the payload key is then encrypted (using yet another key) and stored. The other key can in turn be encrypted (using another key) and stored. Each time a first key is used to encrypt a second key, the first key will be stored on a different storage device than the second key. The keys are then distributed among the storage devices, such that a user must have access to all of the storage devices in order to be able to decrypt all the keys needed to ultimately decrypt the payload key (which is itself distributed among the storage devices. Accordingly, a user cannot decrypt the information stored on any one of storage devices 30 without having access to all of storage devices 130.

Since a user cannot access the information stored on storage devices 130 without having access to all n of storage devices 130, the information can be protected by simply preventing all n of storage devices 130 from being simultaneously placed into situations in which unauthorized users could gain access to the storage devices. For example, if storage devices 130 store a set of backup information that needs to be transferred to a remote site, a first set of n−1 of the storage devices can be mailed (or otherwise transferred) to the remote site. While in transit, even if a malicious user obtains all n−1 of the storage devices, the malicious user will still not be able to decrypt the information stored within. Once the n−1 storage devices have been successfully received, the remaining storage device in the set can be sent to the remote site. Alternatively, one of the storage devices could be sent first, and the remaining n−1 storage devices could be sent after successful receipt of the first device.

While distributed encryption module 110 is shown as part of application 100 in this example, it is noted that all or part of distributed encryption module 110 can alternatively be implemented independently of application 100. For example, encryption module 114 can be implemented on storage controller 120. Distributed encryption module 110 can be implemented in software, hardware, or a combination of software and hardware.

Figure 2:
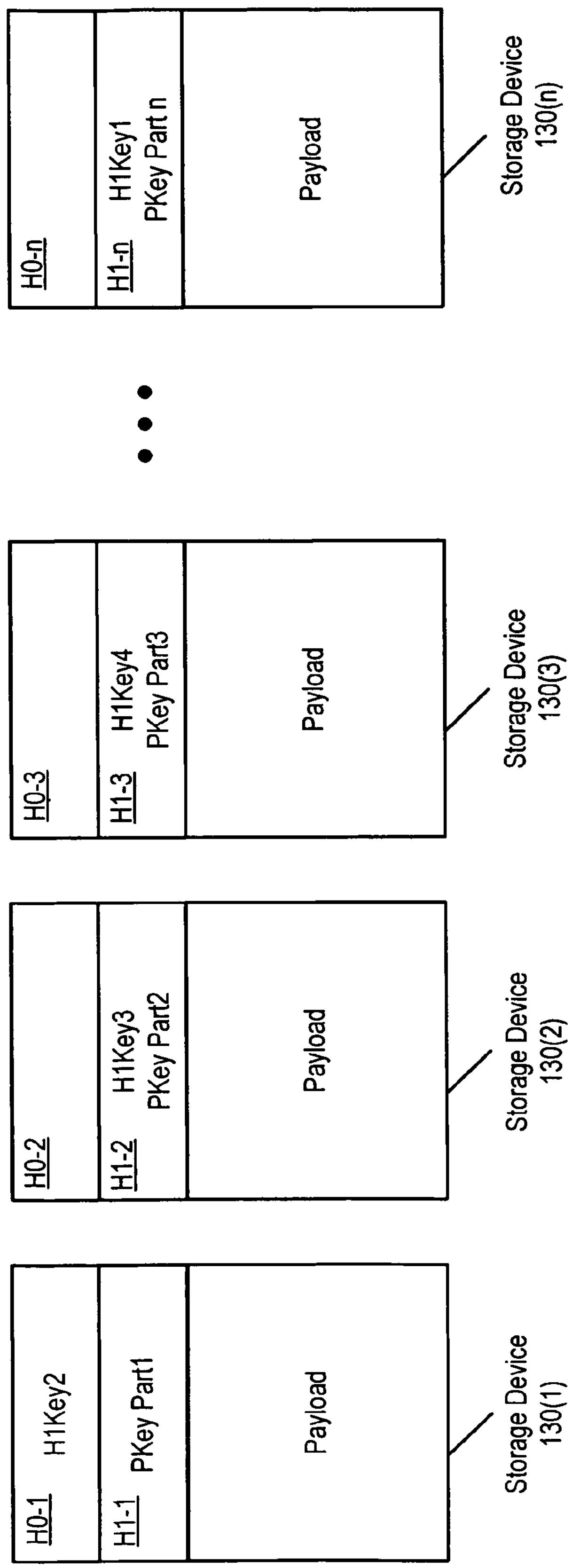
FIG. 2 is a block diagram of a set of n storage devices that store both encrypted information and the keys for encrypting and decrypting that information, according to one embodiment of the present invention.

FIG. 2 is a block diagram of a set of n storage devices 130(1)-130(*n*) (e.g., as shown in FIG. 1) that store both encrypted information and the keys for encrypting and decrypting that information. Each storage device includes an H0 header, an H1 header, and a payload. Headers are identified by a header level, such as H0, followed by an identifier 1-*n* that corresponds to the storage device that includes the header).

H0 headers are unencrypted. H0 headers can store an initial key (used to begin the decryption process) as well as metadata usable to perform the decryption process. For example, H0 can include labels identifying each storage device included in storage devices 130, the number of storage devices 130 needed to be present for successful decryption (all n storage devices in this example), the mapping information identifying the location of each header as well as the payload section within the storage device, and the like.

H1 headers and payloads are encrypted. The H1 headers are used to store cryptographic keys. Each H1 header can store all or part of one or more keys. Each H1 header can also include instructions for reassembling the payload key from the portions of the payload key stored within each H1 header.

Figure 3:
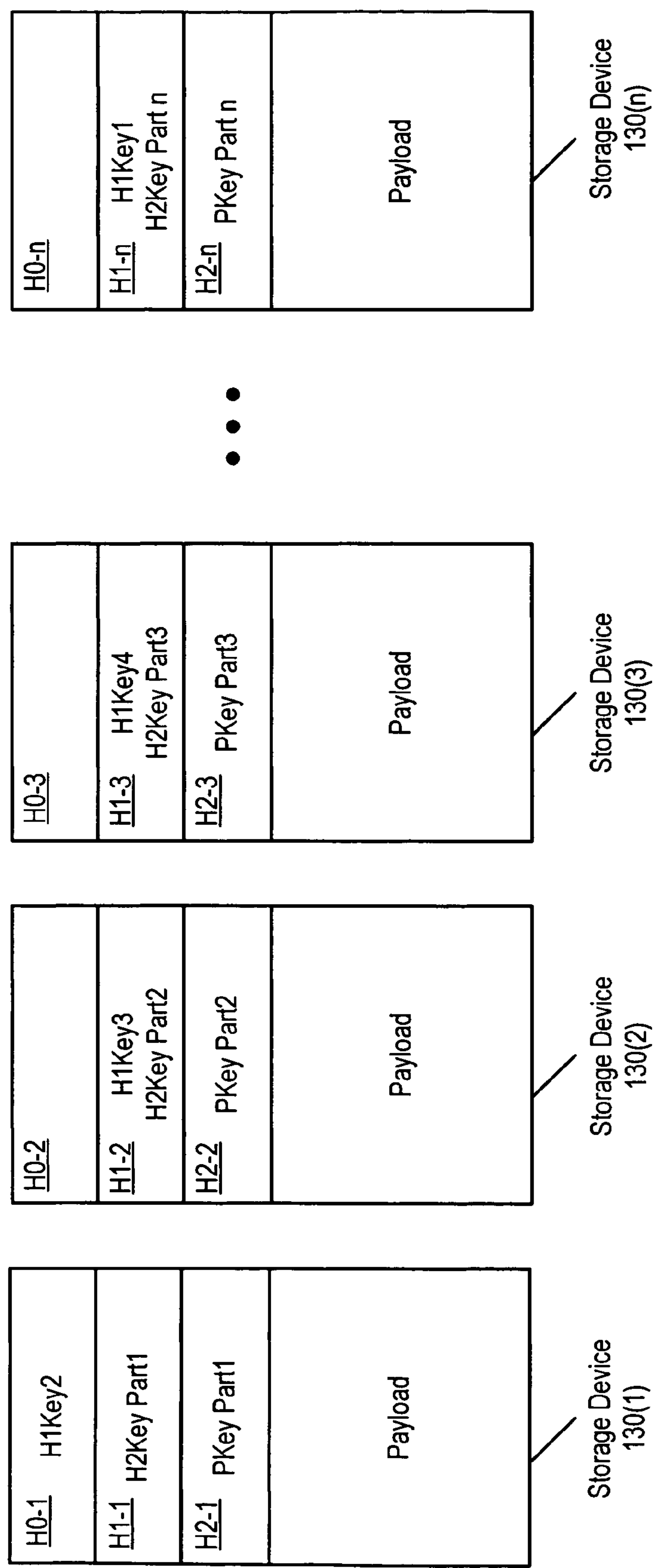
FIG. 3 is a block diagram of another set of n storage devices that store both encrypted information and the keys for encrypting and decrypting that information, according to another embodiment of the present invention.

In this example, n+1 cryptographic keys are used in the encryption and decryption process used when accessing the payload stored on storage devices 130. FIG. 3, described below, provides an example of a situation in which n+2 cryptographic keys are used.

Initially, a key distribution module (such as key distribution module 112 of FIG. 1) creates the n+1 cryptographic keys. The key distribution module then begins providing the keys to an encryption module (e.g., encryption module 114 of FIG. 1) so that information is encrypted as described below. Once all of the information (including the keys themselves) has been encrypted, the key distribution module can write the information to storage devices 130 in the appropriate field (e.g., H0, H1, or payload). Once the encryption process is complete, all of the keys should be discarded from memory.

In this example, a payload key, PKey, has been used to encrypt the payload portion of each storage device. In one embodiment, two or more of the storage device store the same payload. In other embodiments, each storage device stores a different payload than each other storage device within the set.

A different portion of PKey has been stored in a header of each of the n storage devices. PKey Part 1 is stored in header H1-1 of storage device 130(1). PKey Part 2 is stored in header H1-2 of storage device 130(2), PKey Part 3 is stored in header H1-3 of storage device 130(3), and PKey Part n is stored in H1-*n* of storage device 130(*n*).

In one embodiment, the portions of PKey are formed by simply subdividing PKey. For example, if n=4 and PKey is 256 bits in size, PKey can be subdivided into four contiguous 64-bit portions. In such an embodiment, PKey can be reconstructed from the portions by appending each portion to a previous portion (e.g., PKey Part 2 can be appended to PKey Part 1, PKey Part 3 can be appended to the combination of PKey Part 1 and PKey Part 2, and so on). Alternatively, the portions of PKey can generated in other ways (e.g., by applying a particular algorithm or function to all or part of PKey). In general, the portions of PKey are generated in such a manner that all portions are needed in order to regenerate the entire PKey.

The information stored in each H1 header has been encrypted using a key (referred to as an H1Key) that is stored on another storage device. Each H1Key stored on a storage device i is used to encrypt the H1 header of storage device i+1 (in this example, the H1 key stored on storage device 130(*n*) is used to encrypt the H1 header of storage device 130(1)). For example, H1-1 has been encrypted using H1Key1, which is stored in header H1-*n* of storage device 130(*n*). H1-2 has been encrypted using cryptographic key H1Key2, which is stored in header H0-1 of storage device 130(1). H1-3 has been encrypted using cryptographic key H1Key3, which is stored in header H1-2 of storage device 130(2). H1-*n* has been encrypted using cryptographic key H1Key n−1 (not shown), stored in header H1-*n*−1 of storage device 130(*n*−1). As a result of this, each portion of PKEY has been encrypted using a different one of the first-level keys H1Key, H1Key2, H1Key3, and H1Key n.

To decrypt the information stored on storage devices 130, an encryption module (such as distributed encryption module 110 of FIG. 1) can begin by reading the unencrypted H1Key2 from H0-1 of storage device 130(1). The encryption module uses H1Key2 to decrypt H1-2. Similarly, H1Key3 obtained from H1-2 is used to decrypt H1-3. Once all of the H1 headers have been decrypted, the encryption module has all of the information needed to regenerate PKey. PKey is then used to decrypt the payload of any or all of storage devices 130.

As noted above, H0 is unencrypted. Thus, the H1 key (H1Key2) stored on storage device 130(1), is unencrypted. However, this key does not decrypt any information on storage device 130(1). Accordingly, a malicious user who obtains storage device 130(1) will not be able to decrypt any of the information stored on storage device 130(1). Furthermore, a user can only decrypt the payload stored on one of storage devices 130 if the user has obtained access to all n of storage devices 130 in order to obtain all of the portions of PKey. Because of this arrangement, all of the keys needed to ultimately decrypt the payload stored on storage devices 130 are stored on the storage devices themselves, making it unnecessary (at least in this embodiment) to have an external mechanism for maintaining keys.

FIG. 3 is a block diagram of another set of n storage devices that store both encrypted information and the keys for encrypting and decrypting that information. In this example, an additional key (relative to the number of keys used in the example of FIG. 2) is stored by storage devices 130. Such a key can be generated by a key distribution manager during the encryption process and accessed by an encryption module during the decryption process.

Each storage device also includes an additional (relative to the number of headers shown in FIG. 2) header field H2. In particular, storage device 130(1) includes header H2-1, storage device 130(2) includes header H2-2, storage device 130(3) includes header H3-1, and storage device 130(*n*) includes header H3-*n*.

Here, PKey has been distributed among the H2 headers. H2-1 stores PKey Part 1, H2-2 stores PKey Part 2, H2-3 stores PKey Part 3, and H2-*n* stores PKey Part n. One or more of the H2 headers can also store instructions on how to reassemble PKey from the different portions of PKey stored in each H2 header.

The H2 headers have been encrypted by H2Key, which has itself been subdivided (e.g., using one of the techniques that can also be used to subdivide PKey) into portions stored on each of the storage devices. While the technique used to subdivide H2Key can be the same as the technique used to subdivide PKey, some embodiments may use different techniques to subdivide each key.

As shown, the portions of H2Key have been stored in the H1 headers of storage devices 130(1)-130(2). In particular, H2Key Part 1 has been stored in header H1-1, H2Key Part 2 has been stored in header H1-2, H2Key Part 3 has been stored in header H1-3, and H2Key Part n has been stored in header H1-*n*.

The H1 headers are then encrypted in the manner described above with respect to FIG. 2, such that the contents of each H1 header is encrypted using a cryptographic key stored on a neighboring storage device. For example, H1-1 of storage device 130(1) is encrypted using H1Key1, which is stored on storage device 130(*n*). Similarly, H1-2 of storage device 130 (2) is encrypted using H1Key2, which is stored on storage device 130(1). H1-3 of storage device 130(3) is encrypted using H1Key3, which is stored on storage device 130(2).

In this example, to decrypt the payload of storage devices 130, a distributed encryption module begins (much like in the embodiment of FIG. 2) by reading the unencrypted H0-1 header of storage device 130(1) to obtain the unencrypted H1Key2. H1Key2 is used to decrypt H1-2 to obtain H1Key3. H1Key3 is similarly used to decrypt H1-3 to obtain H1Key4. This process continues until all n H1 headers have been decrypted.

At this point, the distributed encryption module has all of the information necessary to reassemble H2Key, which is then used to decrypt the H2 headers of storage devices 130. Once the H2 headers are decrypted, the encryption module has the information needed to reassemble PKey, which can then be used to decrypt the payload of storage devices 130.

Because of the manner in which the keys are distributed, the payload cannot be decrypted by a user unless the user has access to all n of storage devices 130 to obtain all of the parts of PKey. Furthermore, an additional level of security is added (relative to the embodiment depicted in FIG. 2) since the user cannot obtain PKey until all parts of H2Key have been obtained, which also requires access to all n storage devices. Unless the user caches the entire contents of each storage device's H1 and H2 headers the first time that the storage devices are accessed (when obtaining H2Key), the user will have to again obtain access to each of the storage devices in order to obtain the PKey.

The keys in FIGS. 2 and 3 are distributed in such a way that, while a user may not need simultaneous access to all n storage devices (e.g., if the user caches certain information) to ultimately obtain PKey, the user necessarily must have access to all of the storage devices at some point in time. Access to the storage devices can be controlled so that no unauthorized user will ever gain access to all n of the storage devices, effectively preventing unauthorized users from gaining access to the payload, even if the unauthorized users obtain one or more (but fewer than n) of the storage devices.

In the examples of FIGS. 2 and 3, each storage device includes both an unencrypted header H0 and an encrypted header H1. In alternative embodiments, the H0 (unencrypted) headers can be eliminated. In such embodiments, the unencrypted key (H1Key2 in FIGS. 2 and 3) can be stored elsewhere (e.g., in a key manager). Thus, while the examples of FIGS. 2 and 3 provide examples that include two and three levels of headers, it is noted that other embodiments can implement other levels of headers (e.g., one level or more than three levels).

Similarly, the examples of FIGS. 2 and 3 describe situations in which a user must have access to every storage device within a set of storage devices in order to be able to decrypt the information stored by the set of storage devices. In alternative embodiments, a set of storage devices can include m storage devices (where m>n), of which only n must be accessed in order to decrypt the information stored on all m storage devices. In such an embodiment, certain storage devices either store no key information or store the same key information as another storage device within the set.

The examples shown in FIGS. 2 and 3 involve situations in which some headers (e.g., H1 headers) store entire encrypted keys while other headers (e.g., H1 headers and/or H2 headers) store encrypted portions of a key. In alternative embodiments, there can simply be two levels of headers (for storing cryptographic information) on each storage device within the set. The first level header of one storage device can store an unencrypted key (e.g., similar to the H1Key2 of H0), while the second level headers can each store a portion of a payload key that has been encrypted using the unencrypted key. To decrypt the payload, a user accesses the unencrypted key from one storage device. The unencrypted key can then be used to decrypt the information in the second level headers of each storage device in the set. Once that information has been decrypted, the payload key can be regenerated from the portions stored on each storage device. The payload key can then be used to decrypt the payload. To obtain the full payload key, a user must be able to access all of the storage devices in the set, since each of the storage devices stores only a portion of the encrypted payload key.

Figure 4A:
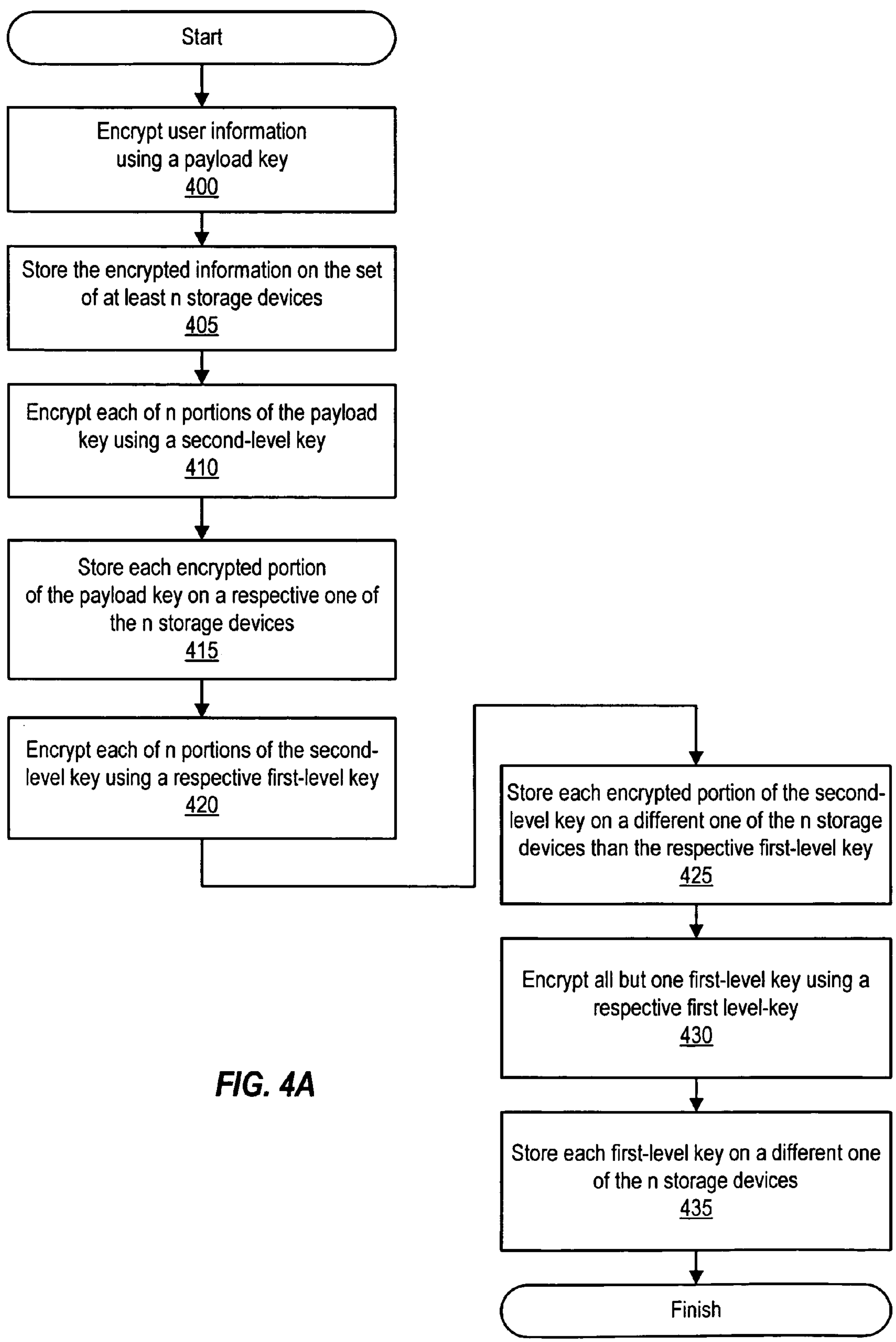
FIG. 4A is flowchart of a method of encrypting and storing a key on the same set of storage devices that store the information encrypted by that key, according to one embodiment of the present invention.

FIG. 4A is flowchart of a method of encrypting and storing a key on the same set of storage devices that store information encrypted by that key. This method can be performed by a distributed encryption module, such as distributed encryption module 110 of FIG. 1. For example, a key distribution module (such as key distribution module 112 of FIG. 1) can generate all of the keys needed, and then control the behavior of an encryption module (such as encryption module 114 of FIG. 1) so that information is encrypted in the manner described below.

The method begins at 400, when user information is encrypted using a payload key. The encrypted information is then stored on a set of at least n storage devices, as shown at 405. In some embodiments, the same user information is stored on each storage device. In other embodiments, each storage device stores at least some user information that is different from user information stored by other storage devices within the set.

At 410, the payload key is subdivided into portions, each of which is encrypted using a second-level key. All of the portions of the payload key are necessary to regenerate the payload key. The encrypted portions of the payload key are then stored on n storage devices, as shown at 415, such that each of the n storage devices stores a different portion of the payload key.

The second-level key is then subdivided into portions, each of which is encrypted using a respective one of n first-level keys, as shown at 420. As with the payload key, all portions of the second-level key are necessary to regenerate the second-level key. Each portion of the second-level key is encrypted using a different first-level key.

Each encrypted portion of the second-level key is then stored to one of the n storage devices. Each portion of the second-level key is stored on a different one of the n storage devices. Each portion of the second-level key is stored on a different one of the storage devices than the first-level key that was used to encrypt that portion of the second-level key, as indicated at 425.

All but one of the first-level keys are then encrypted. These first-level keys are each encrypted using a different first-level key, as indicated at 430. Each first-level key is then stored on a different one of the n storage devices, as shown at 435. In some embodiments, the unencrypted first-level key can be stored somewhere other than one of the n storage devices.

Figure 4B:
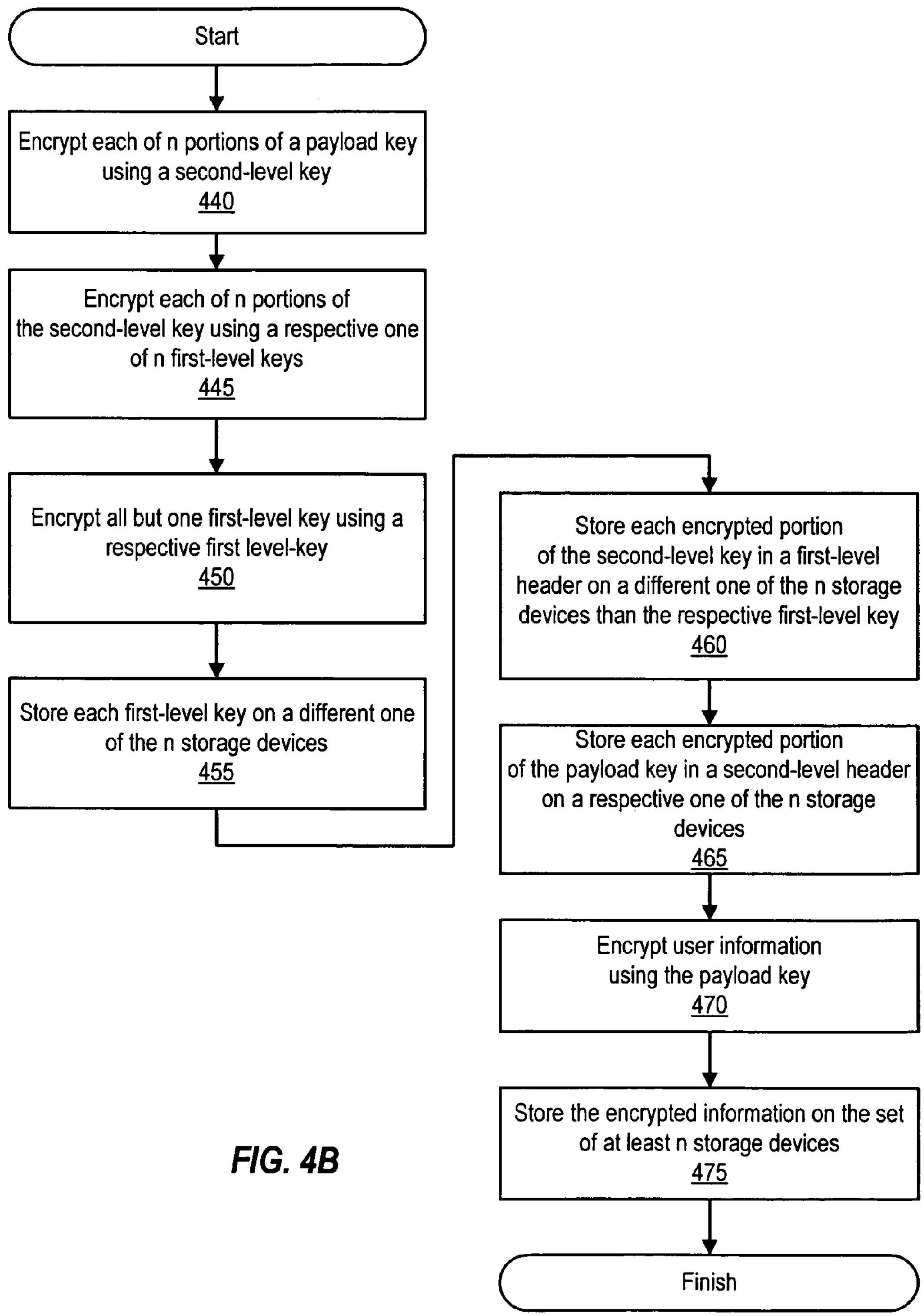
FIG. 4B is flowchart of another method of encrypting and storing a key on the same set of storage devices that store the information encrypted by that key, according to one embodiment of the present invention.

FIG. 4B is flowchart of an alternative method of encrypting and storing a key on the same set of storage devices that store information encrypted by that key. This method can be used when the storage devices are sequential access media, such as tape drives or write-once CDs or DVDs. Accordingly, in this example, the keys and other header information is first generated and then written to the storage media in the desired order (e.g., information in H0 is written first, followed by information in H1, and so on). Like the method of FIG. 4A, the method of FIG. 4B can be performed by a distributed encryption module, such as distributed encryption module 110 of FIG. 1.

The method begins at 440, when the payload key is subdivided into portions, each of which is encrypted using a second-level key. All of the portions of the payload key are necessary to regenerate the payload key.

Then, the second-level key is subdivided into portions, each of which is encrypted using a respective one of n first-level keys, as shown at 445. As with the payload key, all portions of the second-level key are necessary to regenerate the second-level key. Each portion of the second-level key is encrypted using a different first-level key.

All but one of the first-level keys are then encrypted, as shown at 450. Each first-level key is encrypted using a different first-level key. The information (a portion of the second-level key and/or another first-level key) encrypted by a given first-level key can be combined, possibly with other information (such as instructions for reconstructing the second-level key), to form a first-level header (e.g., such as headers H1 of FIGS. 2 and 3).

At 455, the first-level keys are stored on the storage devices, such that each first-level key is stored on a different storage device. For example, the unencrypted first-level key can be stored in a H0 header of one storage device, while the other encrypted first-level keys can be stored in respective H1 headers of the remaining storage devices.

Similarly, at 460, each encrypted portion of the second-level key is stored in a first-level header. Encrypted portions of the second-level key are stored on different storage devices than the first-level key that was used to encrypt them.

It is noted that operations 455 and 460 are likely to be, at least partially, combined. For example, the distributed encryption module can perform operations 455 and 460 by writing the H0 header (containing the unencrypted key as well as any other desired information, such as information describing the mapping of the headers and identities of the storage devices included in the set) to one storage device and then writing the H1 headers (each containing an encrypted first-level key and/or an encrypted portion of a second-level key) to all of the storage devices.

The encrypted portions of the payload key are then stored on the n storage devices, as shown at 465, such that each of the n storage devices stores a different portion of the payload key. The portions of the payload key can be stored, for example, in respective H2 headers.

The user information is encrypted using the payload key, as shown at 470. It is noted that operation 470 can be performed earlier in the process (e.g., such as before or at the same time that the keys are being encrypted) than shown in this example. Then encrypted information is then stored on a set of at least n storage devices, as shown at 475. In some embodiments, the same user information is stored on each storage device. In other embodiments, each storage device stores at least some user information that is different from user information stored by other storage devices within the set.

One alternative to the methods of FIGS. 4A and 4B involves using only first-level keys and a payload key, eliminating the second-level key. In such a method, the payload key is encrypted using the first-level keys in the same manner that the second-level key is encrypted in the methods of FIGS. 4A and 4B.

Other alternatives to the methods of FIGS. 4A and 4B include storing certain keys and/or portions of keys on more than one storage device. For example, if there are m (m>n) storage devices and it is desirable to require only n of the storage devices to be present for decryption, each key or portion of a key can be stored on multiple ones of the m storage devices. However, in such an embodiment, no full key is stored on the same storage device as information encrypted by that key.

Figure 5:
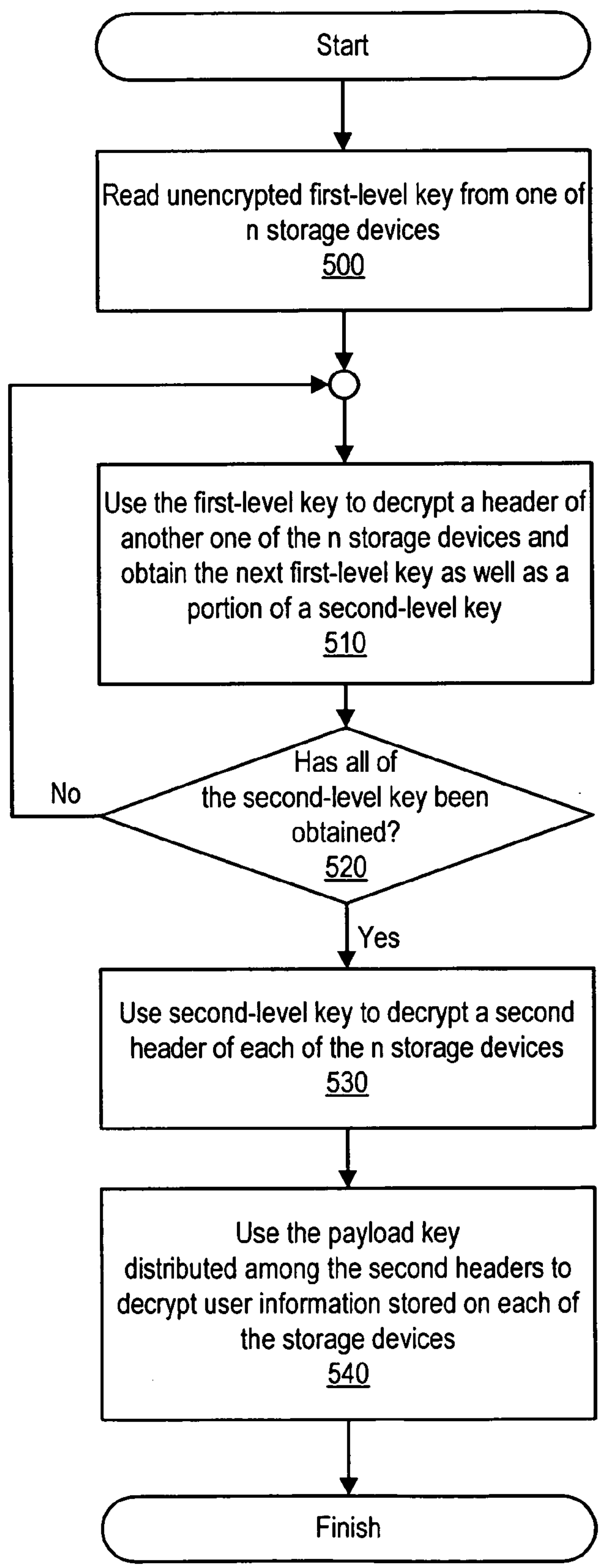
FIG. 5 is flowchart of a method of decrypting a set of information stored on the same set of storage devices that stores the key used to encrypt the set of information, according to one embodiment of the present invention.

FIG. 5 is flowchart of a method of decrypting a set of information stored on the same set of storage devices that stores the key used to encrypt the set of information. This method can be performed by a distributed encryption module, such as distributed encryption module 110 of FIG. 1.

The method begins at 500, when an unencrypted first-level key is read from one of n storage devices. In alternative embodiments in which this first-level key is obtained elsewhere, operation 500 may be eliminated.

The first-level key obtained at 500 is used to decrypt the header of another one of the n storage devices. The decrypted header includes the next first-level key as well as a portion of a second-level key, as indicated at 510.

If all of portions of the second-level key have been obtained (determined at 520), the method proceeds to operation 530. Otherwise, the distributed encryption module repeats operation 510 using the next first-level key.

Once all of the portions of the second-level key have been obtained, the distributed encryption module uses the second-level key to decrypt a second header of each of the n storage devices, as shown at 530. Each second header stores a portion of a payload key. Once all portions of the payload key are obtained, the payload key is regenerated and used to decrypt the user information stored on each storage device, as shown at 540.

In alternative embodiments, the second-level key is not used. In such an embodiment, each header can store a portion of the payload key instead of a portion of the second-level key. Accordingly, in such an embodiment, operation 530 can be eliminated.

FIG. 6 is block diagram of a computer system configured to encrypt and decrypt a key that is stored on the same set of storage devices that store information encrypted by that key. FIG. 6 illustrates how certain elements of a distributed encryption module 110 can be implemented in software.

FIG. 6 is a block diagram of a computing device 600. As illustrated, computing device 600 includes one or more processors 602 (e.g., microprocessors, PLDs (Programmable Logic Devices), or ASICs (Application Specific Integrated Circuits)) configured to execute program instructions stored in memory 604. Memory 604 can include various types of RAM (Random Access Memory), ROM (Read Only Memory), Flash memory, MEMS (Micro Electro-Mechanical Systems) memory, magnetic core memory, and the like. Memory 604 can include both volatile and non-volatile memory. Computing device 600 also includes one or more interfaces 606. Processor 602, interface 606, and memory 604 are coupled to send and receive data and control signals by a bus or other interconnect.

Interface 606 can include a network interface to various networks and/or interfaces to various peripheral buses. Interface 606 can also include an interface to one or more storage devices (e.g., storage devices 130 of FIG. 1). Interface 606 can, for example, generate a request to access (e.g., read or write) information stored by a storage system controlled by storage controller 120 of FIG. 1.

In this example, program instructions and data executable to implement all or part of certain distributed encryption module 110 functionality, including key distribution module 112 and encryption module 114, are stored in memory 604. It is noted that in alternative embodiments, encryption module 114 can be implemented separately (e.g., on a storage controller such as an array controller, tape drive controller, or hard drive controller) from key distribution module 112. The program instructions and data implementing key distribution module 112 and encryption module 114 can be stored on various computer readable media such as memory 604. In some embodiments, such software is stored on a computer readable medium such as a CD (Compact Disc), DVD (Digital Versatile Disc), hard disk, optical disk, tape device, floppy disk, and the like). In order to be executed by processor 602, the instructions and data can be loaded into memory 604 from the other computer readable medium. The instructions and/or data can also be transferred to computing device 600 for storage in memory 604 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

reading a first cryptographic key from a first storage device;

using the first cryptographic key to decrypt a first set of information stored on a second storage device, wherein the second storage device is separate from the first storage device, the first set of information stored on the second storage device comprises at least a portion of a second cryptographic key, and information usable to decrypt an additional portion of the second cryptographic key, and the second cryptographic key is usable to decrypt user information stored on the first storage device.

2. The method of claim 1, wherein a total of n storage devices must be accessed in order to obtain the cryptographic key usable to decrypt the user information stored on the first storage device, wherein n is a number larger than three.

3. The method of claim 1, further comprising:

reading an unencrypted cryptographic key from a set of information stored on a third storage device; and using the unencrypted cryptographic key to decrypt a first set of information stored on the first storage device, prior to reading the first cryptographic key from the first storage device.

4. The method of claim 1, further comprising:

reading a first portion of a third cryptographic key from a first set of information stored on the first storage device; and reading a second portion of the third cryptographic key from the first set of information stored on the second storage device.

5. The method of claim 4, further comprising:

using the third cryptographic key to decrypt user information stored on at least one of the first storage device and the second storage device.

6. The method of claim 4, further comprising:

using the third cryptographic key to decrypt a second set of information stored on the first storage device and a second set of information stored on the second storage device, wherein the second set of information stored on the first storage device comprises a first portion of a fourth cryptographic key, and the second set of information stored on the second storage device comprises a second portion of the fourth cryptographic key.

7. The method of claim 6, further comprising:

using the fourth cryptographic key to decrypt user information stored on at least one of the first storage device and the second storage device.

8. The method of claim 1, wherein the first storage device is one of: a tape storage device, a hard drive, or an optical disc.

9. The method of claim 1, further comprising:

decrypting, based at least in part on the second cryptographic key, a second set of information, wherein the second set of information comprises the cryptographic key usable to decrypt the user information stored on the first storage device; and decrypting, based at least in part on the cryptographic key usable to decrypt the user information stored on the first storage device, the user information stored on the first storage device.

10. The method of claim 1, wherein:

the second cryptographic key is necessary to obtain the cryptographic key usable to decrypt the user information stored on the first storage device.

11. The method of claim 1, wherein:

the first set of information stored on the second storage device comprises a third key; and the third key is usable to decrypt the additional portion of the second cryptographic key.

12. A system comprising:

means for reading a first cryptographic key from a first storage device; and means for using the first cryptographic key to decrypt a first set of information stored on a second storage device, wherein the first set of information comprises at least a portion of a second cryptographic key, and information usable to decrypt an additional portion of the second cryptographic key, the second cryptographic key is usable to decrypt user information stored on the first storage device, and the second storage device is separate from the first storage device.

13. The system of claim 12, wherein a total of n storage devices must be accessed in order to obtain the cryptographic key usable to decrypt user information stored on the first storage device.

14. A non-transitory computer-readable storage medium comprising program instructions executable to:

read a first cryptographic key from a first storage device; and use the first cryptographic key to decrypt a set of information stored on a second storage device, wherein the second storage device is separate from the first storage device, the first set of information stored on the second storage device comprises:

at least a portion of a second cryptographic key, and information usable to decrypt an additional portion of the second cryptographic key, and the second cryptographic key is usable to decrypt user information stored on the first storage device.

15. The non-transitory computer-readable medium of claim 14, wherein the program instructions are executable to access a total of n storage devices in order to obtain the cryptographic key usable to decrypt user information stored on the first storage device.

16. A system comprising:
a key distribution module configured to:
generate a first cryptographic key and a second cryptographic key;
subdivide the second cryptographic key into a plurality of portions;
initiate encryption of each of the portions of the second cryptographic key,
wherein
at least one portion of the second cryptographic key is encrypted using the first cryptographic key; and
store each encrypted portion of the second cryptographic key to a respective one of a plurality of storage devices, wherein
each of the storage devices stores encrypted user data,
the second cryptographic key is usable for recovery of the encrypted user data
each of the storage devices stores a different encrypted portion of the second cryptographic key,
the key distribution module is configured to:
generate a plurality of first cryptographic keys, wherein the plurality of first cryptographic keys comprises the first cryptographic key,
initiate encryption of each portion of the second cryptographic key using a respective one of the first cryptographic keys, wherein each of the first cryptographic keys is used to encrypt a different portion of the second cryptographic key, and
store each of the first cryptographic keys on a different one of the plurality of storage devices than the respective portion of the second cryptographic key.

17. The system of claim 16, further comprising:
an encryption module coupled to the key distribution module, wherein the encryption module is configured to encrypt each portion of the second cryptographic key using the respective one of the first cryptographic keys, wherein each of the first cryptographic keys is used to encrypt a different portion of the second cryptographic key.

18. A system comprising:
a processor configured to:
read a first cryptographic key from a first storage device; and
a distributed decryption module configured to:
use the first cryptographic key to decrypt a set of information stored on a second storage device, wherein
the second storage device is separate from the first storage device, and
the set of information is usable to obtain a second cryptographic key, and
the second cryptographic key is usable to obtain user information stored on the first storage device.

19. The system of claim 18, wherein
the distributed encryption module is configured to access a total of n storage devices in order to obtain the cryptographic key usable to decrypt user information stored on the first storage device.

20. A method comprising:
reading a first device key from a first storage device;
reading a first set of information stored on a second storage device, wherein
the second storage device is separate from the first storage device, and
the first set of information stored on the second storage device is stored in encrypted form on the second storage device;
using the first device key to decrypt the first set of information stored on the second storage device, wherein the first set of information stored on the second storage device comprises:
a first portion of a payload key, and
a second device key,
reading a first set of information stored on a third storage device, wherein
the third storage device is separate from the first and second storage devices, and
the first set of information stored on the third storage device is stored in encrypted form on the third storage device;
using the second device key to decrypt the first set of information stored on the third storage device, wherein the first set of information stored on the third storage device comprises
a second portion of the payload key, and
reading a payload data stored on the first storage device, wherein the payload data stored on the first storage device is stored in encrypted form on the first storage device; and
using the payload key to decrypt the payload data stored on the first storage device.

21. The method of claim 20, further comprising:
reading a first set of information stored on the first storage device; and
decrypting the first set of information stored on the first storage device, wherein the first set of information stored on the first storage device comprises
a third portion of the payload key.

22. The method of claim 20, further comprising:
reading a payload data stored on the third storage device, wherein the payload data stored on the third storage device is stored in encrypted form on the third storage device; and
using the payload key to decrypt the payload data stored on the third storage device.

23. The method of claim 22, further comprising:
reading a payload data stored on the second storage device, wherein the payload data stored on the second storage device is stored in encrypted form on the second storage device; and
using the payload key to decrypt the payload data stored on the second storage device.

* * * * *